(12) United States Patent
Lamprey et al.

(10) Patent No.: US 12,377,793 B2
(45) Date of Patent: Aug. 5, 2025

(54) CENTER CAMERA MIRROR SYSTEM SPOILER MOUNTING FOR VEHICLE, AND TAILGATE ASSEMBLY INCLUDING SAME

(71) Applicant: Honda Motor Co., Ltd., Tokyo (JP)

(72) Inventors: Timothy Lamprey, Raymond, OH (US); Jason Scott Borland, Marysville, OH (US); Jesse W. Schlabach, Marysville, OH (US); Hirofumi Takemoto, Dublin, OH (US); David J. Rose, West Mansfield, OH (US); Timothy J. Rupp, Radnor, OH (US); Douglas R. Kaltenmark, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 18/450,741

(22) Filed: Aug. 16, 2023

(65) Prior Publication Data

US 2025/0058722 A1 Feb. 20, 2025

(51) Int. Cl.
*B60R 11/04* (2006.01)
*B60R 1/08* (2006.01)
(Continued)

(52) U.S. Cl.
CPC ............. *B60R 11/04* (2013.01); *B60R 1/08* (2013.01); *B60R 1/26* (2022.01);
(Continued)

(58) Field of Classification Search
CPC .. B60R 11/04; B60R 1/08; B60R 1/26; B60R 1/06; B60R 2001/1253; B60R 2011/004; B60R 2011/0047; B60R 2300/8026
See application file for complete search history.

(56) References Cited

U.S. PATENT DOCUMENTS 10,308,295 B2   6/2019   Krishnan et al.
10,780,927 B2   9/2020   Prabhakar
(Continued)

FOREIGN PATENT DOCUMENTS

CN   208715312 U   4/2019
CN   209366055 U   9/2019
(Continued)

*Primary Examiner* — Twyler L Haskins
*Assistant Examiner* — John H Morehead, III
(74) *Attorney, Agent, or Firm* — KENEALY VAIDYA LLP

(57) ABSTRACT

A center camera mirror system spoiler mounting for a vehicle that can include a spoiler inner panel, a spoiler outer panel and a camera assembly. The spoiler inner panel can be configured to be mounted onto an exterior panel of the vehicle and the spoiler outer panel can be connected to the spoiler inner panel. The spoiler outer panel can include an outer surface that is an exterior surface of the vehicle, a camera opening passing through the spoiler outer panel, and a first datum. The camera assembly can be fixed to the spoiler inner panel in a predetermined orientation with respect to the spoiler inner panel, and can include a lens, and a second datum engaging the first datum. The lens can be in a predetermined alignment with respect to the camera opening when the second datum engages the first datum.

20 Claims, 6 Drawing Sheets

(51) Int. Cl.
*B60R 1/12* (2006.01)
*B60R 1/26* (2022.01)
*B60R 11/00* (2006.01)

(52) U.S. Cl.
CPC . *B60R 2001/1253* (2013.01); *B60R 2011/004* (2013.01); *B60R 2011/0047* (2013.01); *B60R 2300/8026* (2013.01)

(56) References Cited

U.S. PATENT DOCUMENTS

| | | | |
|---|---|---|---|
| 2009/0309710 A1* | 12/2009 | Kakinami | G06V 20/586 348/148 |
| 2017/0028936 A1* | 2/2017 | Matsumoto | B62D 37/02 |
| 2017/0272633 A1* | 9/2017 | Minikey, Jr. | H04N 23/57 |
| 2018/0143395 A1* | 5/2018 | Takahashi | G03B 17/12 |
| 2018/0215313 A1* | 8/2018 | Diessner | B60R 1/26 |
| 2020/0369205 A1* | 11/2020 | Nakai | H04N 7/18 |
| 2021/0231839 A1* | 7/2021 | Koshiba | G03B 17/02 |
| 2021/0302807 A1* | 9/2021 | Hein | G03B 30/00 |
| 2022/0097495 A1* | 3/2022 | Snider | B60J 1/18 |

FOREIGN PATENT DOCUMENTS

| | | | |
|---|---|---|---|
| CN | 210942012 U | 7/2020 | |
| CN | 211076103 U | 7/2020 | |
| CN | 211567838 U | 9/2020 | |
| WO | 2019122460 A1 | 6/2019 | |
| WO | 2023285366 A1 | 1/2023 | |

* cited by examiner

CENTER CAMERA MIRROR SYSTEM SPOILER MOUNTING FOR VEHICLE, AND TAILGATE ASSEMBLY INCLUDING SAME

BACKGROUND

The disclosed subject matter relates to a mounting arrangement for a center camera mirror system for a vehicle. More particularly, the disclosed subject matter relates to methods and apparatus that mount a camera in a rear spoiler of a vehicle.

A vehicle can include a pair of exterior mirrors and an interior mirror to provide a driver of the vehicle with a rearward view of the space outside of the vehicle. However, each of these mirrors can have a blind spot in which an object that is adjacent to the vehicle and behind the driver's seat might not be visible in one or more of the mirrors.

In an effort to reduce or eliminate any or all of the blind spots, a vehicle can include a camera system that includes a respective camera mounted in or adjacent to each of the exterior mirrors and/or camera mounted at a rear end of the vehicle. Each of the cameras can be electrically connected to a display panel inside of the vehicle in which the image from each of the cameras can be displayed alone or in any combination with the image(s) of the other camera(s). The camera mounted at the rear end of the vehicle can be referred to as a rearview camera or a center camera and transmit a live image to the display panel when the driver selects a reverse travel direction using a gear selector or directional switch. Additionally, the display can present the live image from the rearview camera when the vehicle is changing lanes or merging into traffic. The rearview camera can be mounted adjacent to a mounting area for a license plate, or in a spoiler at the rear end of the vehicle.

SUMMARY

Some embodiments are directed to a center camera mirror system spoiler mounting for a vehicle that can include a spoiler inner panel, a spoiler outer panel and a camera assembly. The spoiler inner panel can be configured to be mounted onto an exterior panel of the vehicle and the spoiler outer panel can be connected to the spoiler inner panel. The spoiler outer panel can include an outer surface that is an exterior surface of the vehicle, a camera opening passing through the spoiler outer panel, and a first datum. The camera assembly can be fixed to the spoiler inner panel in a predetermined orientation with respect to the spoiler inner panel, and can include a lens, and a second datum engaging the first datum. The lens can be in a predetermined alignment with respect to the camera opening when the second datum engages the first datum.

Some embodiments are directed to a center camera mirror system spoiler mounting for a vehicle that can include a spoiler and a camera assembly. The spoiler can be configured to be mounted at a rear end of the vehicle, and include an aerodynamic surface that is configured to be exposed to air flowing along the vehicle when the vehicle is travelling. The spoiler can include an inner panel configured to be mounted onto an exterior panel of the vehicle and an outer panel connected to the inner spoiler panel. The inner panel can include a datum surface having a predetermined orientation. The outer panel can include an outer surface forming at least a portion of the aerodynamic surface, a camera opening passing through the outer panel, and a first datum. The camera assembly can be fixed to and abut the datum surface, and can include a lens, and a second datum spaced away from the lens and engaging the first datum structure. The lens can be in a predetermined alignment with respect to the camera opening when the second datum engages the first datum.

Some embodiments are directed to a center camera mirror system spoiler mounting for a vehicle that can include a spoiler inner panel, a spoiler outer panel and a camera. The spoiler inner panel can be configured to be mounted onto an exterior panel of the vehicle and include a first datum surface. The spoiler outer panel can be connected to the spoiler inner panel and include an outer surface that is an exterior surface of the vehicle, a camera opening passing through the spoiler outer panel, and a first datum. The camera assembly can be fixed to the spoiler inner panel and abutting the first datum surface, and include a lens having an optical axis, and a second datum engaging the first datum structure. The optical axis can be in a predetermined alignment with respect to the camera opening when the second datum engages the first datum.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
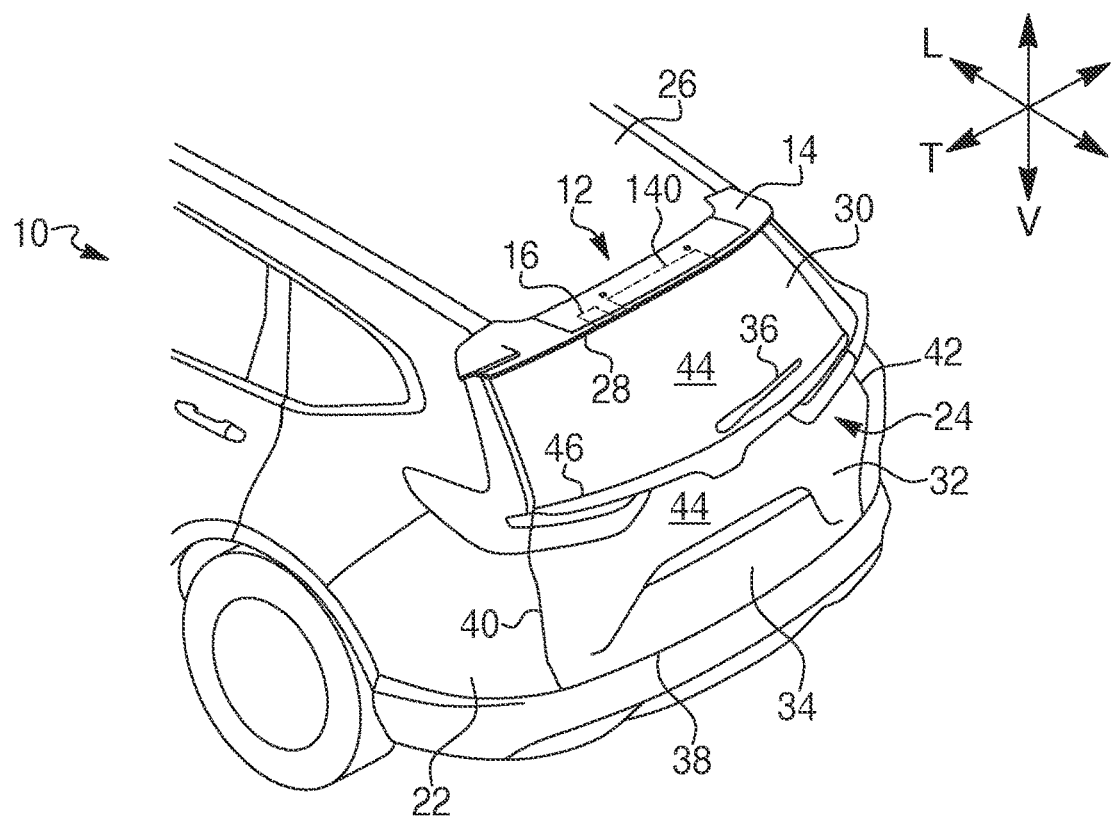
FIG. 1 is a perspective view of rear end portion of a vehicle including a center camera mirror system spoiler mounting made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

In a display system that includes a plurality of cameras spaced around the perimeter of the vehicle, it can be advantageous to display a composite image that combines the live, real-time images from each of the cameras into a single image and presents the combined image on the display panel. Thus, it can also be advantageous to provide datum features on appropriate structure(s) of the vehicle that can facilitate precise and accurate positioning and aiming of the camera(s) during assembly of camera(s) onto the vehicle so that the composite image correlates to the actual environment surrounding the vehicle.

In addition to displaying the image transmitted by any number of cameras mounted on a vehicle, the display panel can be configured to overlap graphic symbols representing the width of the vehicle and projected travel path of the vehicle when the vehicle is traveling in the forward or reverse direction. As a result, it can be beneficial to accurately and precisely position and aim the camera on the vehicle so that the software that creates the markings can accurately and precisely superimpose the graphic symbols onto the live image received from the camera.

The camera can be mounted in or adjacent to an opening in an exterior panel of the vehicle so that the camera has predetermined line of sight to a predetermined target region outside of the vehicle. As such, the camera and the exterior panel can be visible to an observer and it can be desirable for the fit and finish between the camera and the exterior panel to be pleasantly perceived by the observer.

However, the exterior panel can be one of a plurality of parts or components that are connected to each other, and each of these parts or components can introduce a respective set of tolerances that add to each other in the final assembled structure. The position and aiming of the camera can have one or more predetermined tolerances that provide a desired performance of the camera. The stack-up of the tolerances of the parts onto which the camera is mounted might exceed the tolerance(s) set for the camera, thereby causing the camera to be out of specification when assembled to the vehicle and adversely impairing the performance of the camera as compared to the desired performance of the composite image and/or the appearance of the graphic symbols overlaid onto the display camera image. Manufacturing and engineering constraints can limit or prevent reduction of the tolerance stack-up in an effort to adjust the tolerance stack-up so that it falls within the tolerance(s) set for the camera.

Conversely, it can be possible to reduce the tolerance stack-up by mounting the camera onto a different part or different component that is not the exterior panel. This can reduce the overall tolerance stack-up because one or more of the tolerances of the exterior panel can be omitted from the tolerance stack-up. However, the tolerance(s) set for the mounting between different part/component and the camera can be incompatible with the tolerance(s) set to provide the desired fit and finish between the camera and the exterior panel. Thus, this alternate arrangement can adversely impact an observer's perception of the fit and finish between the camera and the exterior panel.

Therefore, it can be advantageous to provide a mounting arrangement for a camera that can accurately and precisely aim and position the camera to achieve a desired performance of the camera, account for the tolerance stack-up of the structure(s) onto which the camera is mounted, and provide a positive perception of the fit and finish between the camera and an exterior panel.

FIG. 1 illustrates an embodiment of a vehicle 10 that includes a center camera mirror system spoiler mounting ("mounting assembly") 12 made in accordance with principles of the disclosed subject matter. The vehicle 10 can include a longitudinal direction L, a transverse direction T and a vertical direction V that are orthogonal to each other. The mounting assembly 12 can include a spoiler 14 and a camera assembly 16. FIG. 1 schematically illustrates the camera assembly 16 in phantom. Referring to FIGS. 3-7, the mounting assembly 12 can include at least one aiming and positioning datum feature 17 that can accurately and precisely aim and position the camera assembly 16 with respect to the directions L, T, V and at least one fit and finish datum feature 19 that can position the camera assembly 16 in a predetermined orientation with respect to a camera opening 56 (FIGS. 2 and 7) in an exterior panel of the vehicle 12 such, but not limited to, a spoiler outer lower panel 20 (FIGS. 2-7) of the spoiler 14.

Figure 2:
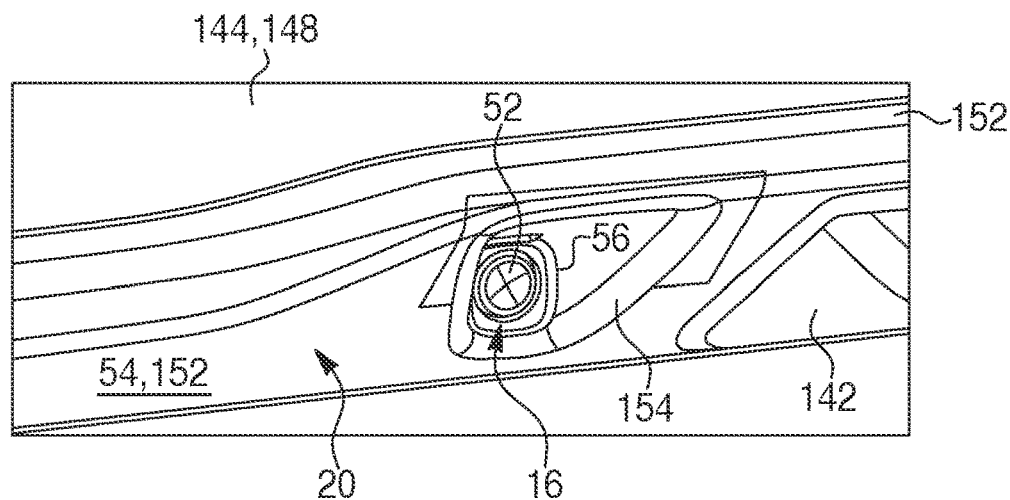
FIG. 2 is a perspective view of an enlarged portion of a spoiler of the vehicle of FIG. 1.
Figure 3:
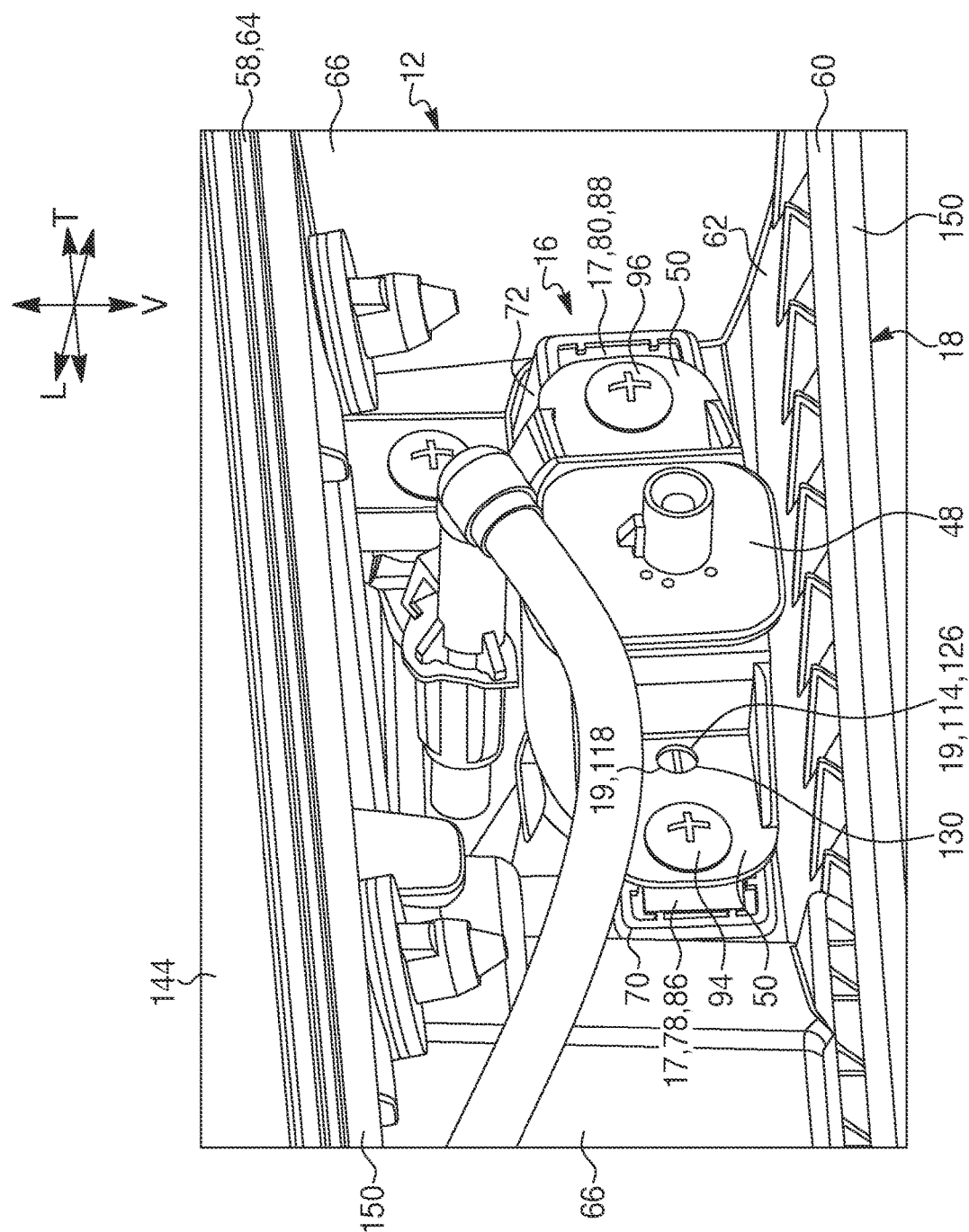
FIG. 3 is perspective of view of the inside of the spoiler of the vehicle of FIG. 1.
Figure 7:
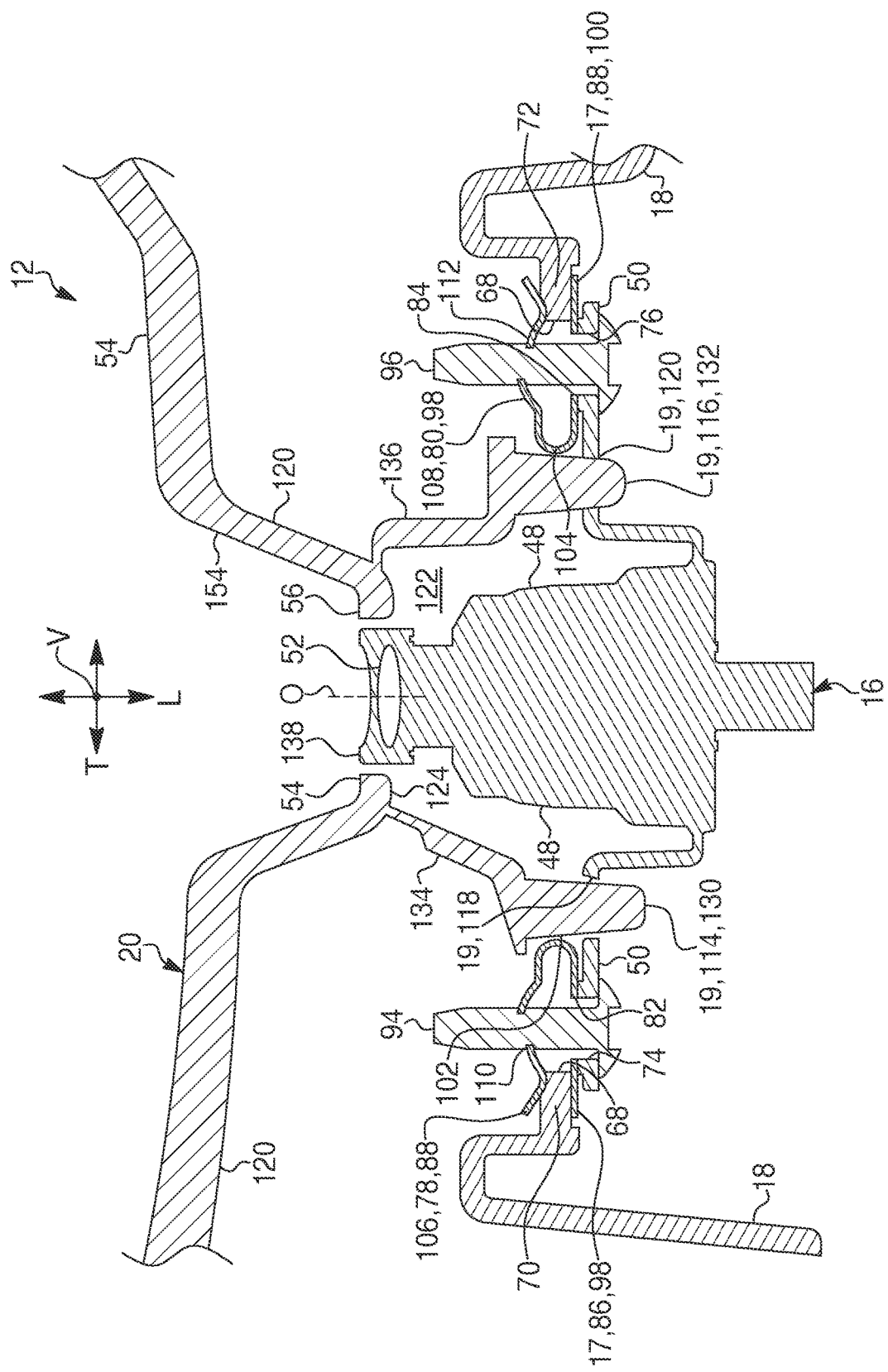
FIG. 7 is a cross-sectional view taken along line 7-7 of FIG. 5.

Referring to FIGS. 2 and 7, the camera assembly 16 can include at least one optical element such as, but not limited to a lens 52. The lens 52 is schematically illustrated in FIG. 7. Predetermined positioning and aiming tolerances for the camera assembly 16 and/or the lens 52 can be set so that the camera assembly 16 can provide a desired level of performance for the image displayed for the driver of the vehicle 10. The spoiler 14 can be assembled from a plurality of pieces, components, subassemblies, etc. Thus, the finally assembled spoiler 14 can have one or more stacked tolerances with respect to the directions L, T, V of the vehicle 10. The aiming and positioning datum feature 17 can accurately and precisely position and aim the camera assembly 16 and/or the lens 52 within the predetermined tolerance(s) despite the tolerance stack-up of the spoiler 14. The fit and finish datum feature 19 can provide an observer with a pleasant perception of the fit and finish between the camera assembly 16 and the camera opening 56 in the spoiler 14 despite the tolerance stack(s) of the spoiler 14.

Referring to FIGS. 3-7, the spoiler 14 can include a spoiler inner panel 18 and a spoiler outer lower panel 20 that is mounted on the spoiler inner panel 18. Thus, the location of the camera opening 56 (FIGS. 2 and 7) in the spoiler 14 can be subjected to the stacked tolerances of the spoiler inner panel 18 and the spoiler outer lower panel 20.

The aiming and position datum feature 17 can be provided on the spoiler inner panel 18 and the camera assembly 16, and the fit and finish datum feature 19 can be provided on camera assembly 16 and the spoiler outer lower panel 20. The aiming and position datum 17 can be spaced away from the spoiler outer lower panel 20 and the fit and finish datum feature 19 can be spaced away from the spoiler inner panel 18. That is, the aiming and position datum 17 can be on a structure that is separated or split from the structure on which the fit and finish datum feature 19 is provided. By separating or splitting the datum features 17, 19 in this manner, the aiming and positioning of the camera assembly 16 and/or the lens 52 can avoid the tolerance stack-up caused by the spoiler outer panel 20 being mounted on the spoiler inner panel 18. By separating or splitting the fit and finish datum 19 from the spoiler inner panel 18, the fit and finish datum feature 19 can promote a positive perception by and observer of the fit and finish between the camera assembly 16 without adversely impacting the aiming and positioning of the camera assembly 16 and/or the lens 52.

The aiming and positioning datum feature 17 can fix the aiming direction of the camera assembly 16 (or lens 52) with respect to the transverse direction T and the vertical direction V and fix the location of the camera 16 (or the lens 52) relative to a structure of the vehicle 10 such as, but not limited to, the tailgate 24 in the longitudinal direction L of the vehicle 10. Although the tolerances of the spoiler inner panel 18 can impact the accuracy and precision of the location and aiming of the camera assembly 16 and/or the lens 52 relative to the tailgate 24, the tolerances of the spoiler inner panel 18 can be predetermined. Thus, the tolerances for the aiming and positioning datum feature 17 can be more precisely and accurately controlled and the overall position and aiming of the camera assembly 16 can be more precisely and accurately controlled as compared to locating the aiming and positioning datum feature 17 on the spoiler outer lower panel 20.

Referring to FIG. 7, the camera assembly 16 can include a camera housing 48 and the camera opening 56 can extend through the spoiler outer lower panel 20. The camera opening 56 can extend through an outer surface 54 of the spoiler outer lower panel 20 and expose the camera assembly 16—specifically, the lens 5—to the outside environment of the vehicle 10.

The fit and finish datum feature 19 can fix the position of the camera opening 56 with respect to the camera housing 48 and/or the lens 52 in at least one of the transverse direction T and the vertical direction V. Since the fit and finish datum feature 19 is separate or split from the spoiler inner panel 18, the perceived fit and finish between the camera assembly 16 and the exterior surface 54 can be unaffected by the aiming and positioning datum feature 17 or other structure of the spoiler 14.

Returning to FIG. 1, the vehicle 10 can include a body 22 and the tailgate 245 can be hinged to the body 22 adjacent to an upper end 28 of the tailgate 24. The body 22 can include a roof panel 26. The tailgate 24 can pivot relative to the body 22 near the upper end 28 of the tailgate 24 to selectively open and close an opening at a rear end of the body 22. The spoiler 14 can be mounted onto the tailgate 24 adjacent to the upper end 28 of the tailgate 24 in any appropriate manner such as, but not limited to, one or more threaded fasteners, one or more clips, one or more clamps, or any combination of these fastening elements.

The tailgate 24 can include a rear window 30, an outer panel 32, a location 34 for mounting a license plate, a rear wiper 36, a lower end 38, a left side 40, a right side 42 and an outer surface 44. The lower end 38 and the upper end 28 can be boundaries of the tailgate 24 in the vertical direction V. The left side 40 and the right side 42 can be boundaries of the tailgate 24 in the transverse direction T. The outer surface 44 can extend along the outer panel 32 and the rear window 30. The outer surface 44 can form a rear boundary of the vehicle 10 in the longitudinal direction L and extend from each of the ends 28, 38 and the sides 40, 42.

The tailgate 24 can include a window opening 46 and the rear window 30 can close the opening 46. The rear window 30 can be fixed in the window opening 46, or the rear window 30 can be movable mounted in the tailgate 24 to selectively extend into and retract from the window opening 46.

Figure 6:
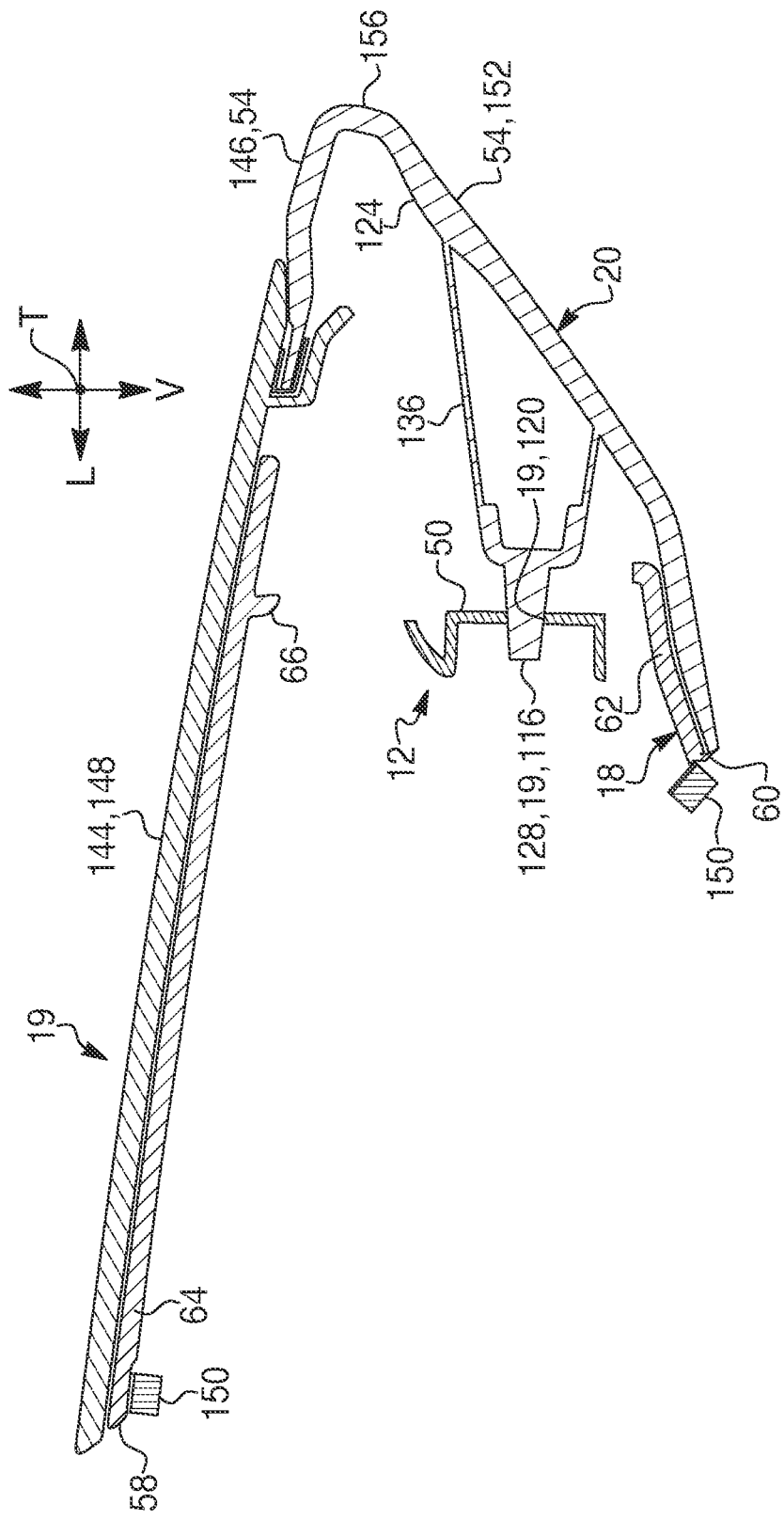
FIG. 6 is a cross-sectional view taken along line 6-6 of FIG. 5.

The spoiler inner panel 18 can be mounted onto the portion of outer surface 44 that extends along the outer panel 32 and above the rear window 30 as viewed in FIG. 1. Referring to FIG. 6, the spoiler inner panel 18 can terminate in the longitudinal direction L at an upper end 58 and a lower end 60. The upper and lower ends 58, 60 can face and abut the outer surface 44 of the tailgate 24. The spoiler inner panel 18 can be connected directly to the outer panel 32 at one or more locations adjacent to the each of the ends 58, 60 in any appropriate manner such as, but not limited to, one or more threaded fasteners, one or more clips, one or more clamps, or any combination of these fastening elements.

Figure 4:
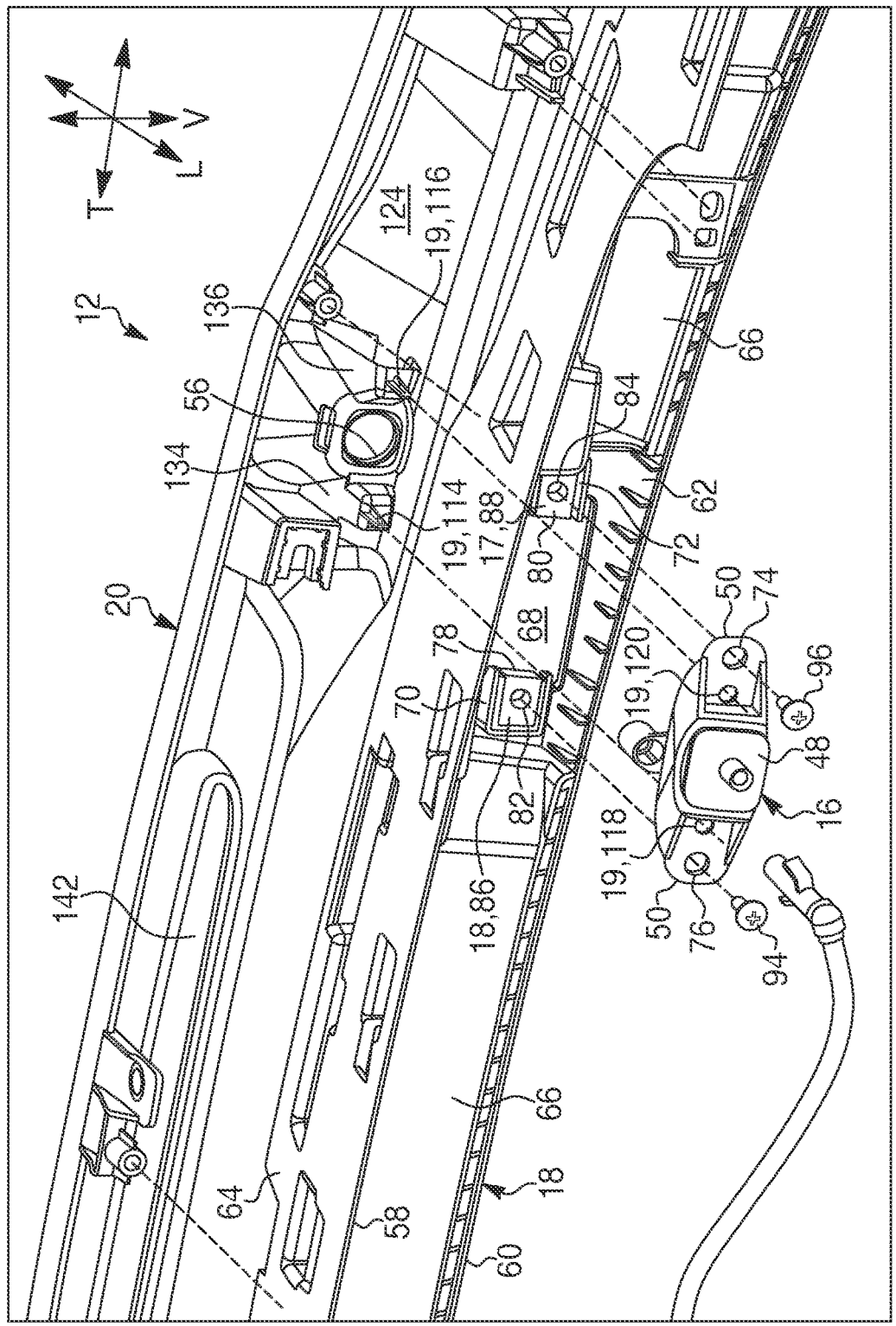
FIG. 4 is an exploded view of the spoiler of the vehicle of FIG. 1.
Figure 5:
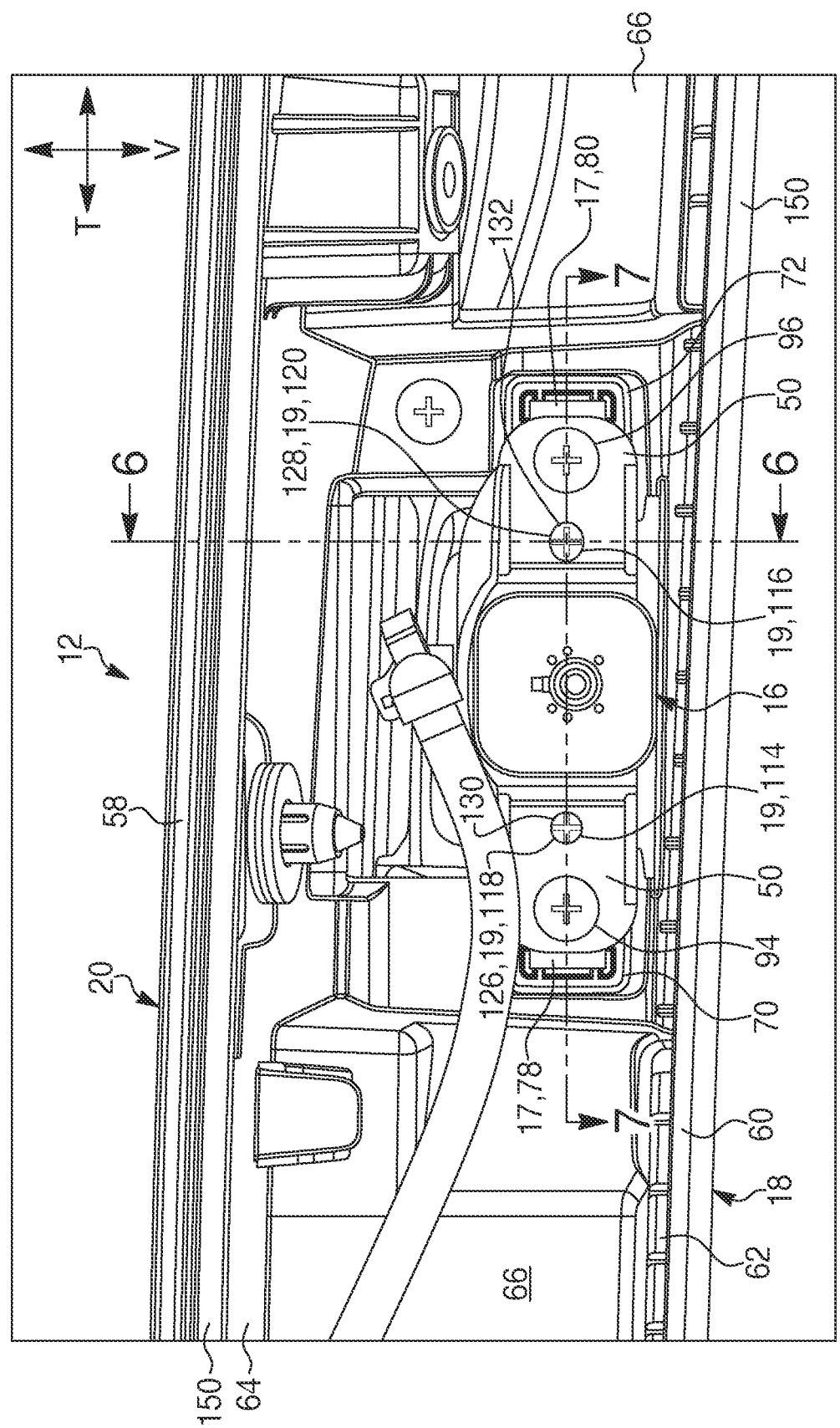
FIG. 5 is a plan view of the inside of the spoiler of the vehicle of FIG. 1.

Referring to FIGS. 4 and 6 collectively, the spoiler inner panel 18 can include a lower wall 62, an upper wall 64 and a connecting wall 66. The lower and upper walls 62, 64 can extend generally in the longitudinal direction L and the transverse direction T, and can be inclined with respect to the longitudinal direction L and the vertical direction V. The connecting wall 66 can extend generally along the transverse direction T and the vertical direction V and can be inclined with respect to vertical direction V. The aiming and positioning datum 17 can be located on the connecting wall 66 at a location that is between and spaced away from the lower and upper walls 62, 64 in the vertical direction V.

The spoiler inner panel 18 can include a housing opening 68 that extends through the connecting wall 66 and the aiming and positioning datum feature 17 can include a pair of mounting tabs 70, 72 on the spoiler inner panel 18 that are spaced away from each other in the transverse direction T by the housing opening 68. That is, the mounting tabs 70, 72 can be adjacent to the housing opening 68 in the transverse direction T. Referring to FIGS. 4 and 7, the camera housing 48 can extend through the housing opening 68 and into a space 122 that extends from the connecting wall 68 to an inner surface 124 of the spoiler outer lower panel 20 in the longitudinal direction L.

Referring to FIGS. 4 and 7, the camera assembly 16 can include an imaging bracket 50 and a pair of mounting holes 74, 76 can extend through imaging bracket 50. The imaging bracket 50 can protruded from both sides of the camera housing 48 with respect to the transverse direction T. The camera housing 48 and the imaging bracket 50 can be integrally formed as a single unit. The imaging bracket 50 can be located on an inner side of the connecting wall 66 and the lens 52 can located on an outer side of the connecting wall 66 with respect to the longitudinal direction L.

Referring to FIGS. 3-5 and 7, the aiming and positioning datum feature 17 can include a pair of mounting clips 78, 80 mounted onto a respective one of the mounting tabs 70, 72. A respective clip hole 82, 84 (FIGS. 4 and 7) can extend through a respective one of the mounting clips 78, 80. The first clip hole 82 can be aligned or concentric with the first mounting hole 74 and the second clip hole 84 can be aligned or concentric with the second mounting hole 76.

The aiming and positioning datum 17 can include a respective datum surface 86, 88 on a respective one of the mounting clips 78, 80 and datum surfaces 90, 92 (FIG. 7) on the imaging bracket 50 that abuts a respective one of the datum surfaces 86, 88. The datum surfaces 86, 88, 90, 92 can position the imaging bracket 50, and by extension, the lens 52, at a predetermined location in the longitudinal direction L relative to the outer surface 44 of the tailgate 24 when the datum surfaces 90, 92 of the image bracket 50 abut the datum surfaces 86, 88 on the spoiler inner panel 18.

Referring to FIG. 7, the datum surfaces 86, 88, 90, 92 can be configured to aim the optical axis O of the lens 52 in a predetermined direction when the datum surfaces 90, 92 abut the datum surfaces 86, 88. Specifically, the datum surfaces 86, 88 can be configured to rotate the optical axis O about an axis that is parallel to the transverse direction T by a predetermined angle (i.e., a pitch angle) and/or rotate the optical axis O about an axis that is parallel to the vertical direction V by an predetermined angle (i.e., a yaw angle) such that the optical axis O is non-parallel to the longitudinal direction L. In alternate embodiments, the datum surfaces 86, 88 can be configured to aim the optical axis O in a direction that is parallel to the longitudinal direction L. In this alternate embodiment, each of the pitch angle and the yaw angle can have a value of 0°.

Referring to FIGS. 3-5 and 7, collectively, the mounting assembly 12 can include a pair of fasteners 94, 96 that can connect the image bracket 50 to the mounting tabs 70, 72 and the mounting clips 78, 80. The first fastener 94 can extend through the first mounting hole 74 and the first clip hole 82. The second fastener 96 can extend through the second mounting hole 76 and the second clip hole 84. Thus, the fasteners 94, 96 can position the camera assembly 16 in the transverse direction T and the vertical direction V.

The mounting clips 78, 80 can be resilient members that are elastically deformed when the fasteners 94, 96 connect the image bracket 50 to the mounting tabs 70, 72. The second mounting clip 80 can be a mirror image of the first mounting clip 80.

Referring to FIG. 7, the first mounting clips 78, 80 can include a respective first member 98, 100, a respective bend 102, 104 and a respective second member 106, 108. The respective bend 102, 104 can connect the respective first member 98, 100 to the respective second member 106, 108. The respective clip hole 82, 84 can extend through the respective first member 94, 98, 100. The respective second member 106, 108 can include a respective through hole 110, 112 and the respective fastener 94, 96 can extend through the respective through hole 110, 112. Each of the fasteners 94, 96 can include threads that engage the respective through hole 100. The respective fastener 94, 96 can elastically deform the respective mounting clip 78, 80 along the respective bend 102, 104 so that the respective first member 98, 100 and the respective second member 106, 108 moves toward each other to clamp the respective mounting tab 70, 72 between the respective members 102, 106; 104, 108. The clip holes 82, 84 and the datum surfaces 86, 88 can be on the respective the first member 98, 100.

Thus, the mounting system 12 can aim the optical axis in a desired direction and position the camera assembly 16 and/or the lens 52 in a position along the outer surface 44 of the tailgate 24 with respect to the directions L, T, V independently of the spoiler outer lower panel 20.

Referring to FIGS. 3-7, the fit and finish datum structure 19 can include a pair of protrusions 114, 116 formed on the spoiler outer lower panel 20 and a pair of datum holes 118, 120 formed in the imaging bracket 50. The protrusions 114, 116 and the datum holes 118, 120 can be dimensioned so that the respective protrusion 114, 116 is tightly fitted into the respective datum hole 118, 120. For example, an outer dimension of the protrusions 114, 116 can be greater than a corresponding inner dimension of the datum holes 118, 120 so that the respective protrusion 114, 116 forms an interference fit with the respective datum hole 118, 120.

The protrusions 114, 116 can have a cross-sectional shape of a cross and can include a respective first cross member 126, 128 that extends along the longitudinal direction L and vertical direction V and a respective second cross member 130, 132 that extends along the longitudinal direction L and the transverse direction T. The cross members 126, 128 can intersect each other a middle portion of each of the cross members 126, 128. That is, the projections 116, 118 can have a symmetrical cross-sectional shape of a plus sign (+).

Referring to FIGS. 6 and 7, the spoiler outer lower panel 20 can include a pair of risers 134, 136 protruding from the inner surface 124 in the longitudinal direction. The risers 134, 136 can be located on either side of the camera opening 56 in the transverse direction T. The first protrusion 114 can protrude from the first riser 134 along the longitudinal direction L and the second protrusion 116 can protrude from the second riser 136 along the longitudinal direction L.

The cross members 126, 128, 130, 132 can be tapered along the longitudinal direction L. The smaller ends of the cross members 126, 128, 130, 132 can be on an inner side of the imaging bracket 50 with respect to the longitudinal direction L, the larger ends of the cross members 126, 128, 130, 132 can be on an outer side of the imaging bracket 50 with respect to the longitudinal direction L. That is, the imaging bracket 50 can be located between the smaller ends of the cross members 126, 128, 130, 132 and the risers 134, 136 in the longitudinal direction L. The slope of the tapered shape of the cross members 126, 128, 130, 132 can be predetermined so that an outer surface 138 of the camera housing 48 is aligned with the outer surface 54 of the spoiler outer lower panel 20 in such a manner that an observer can positively perceive the fit and finish between the spoiler outer panel 20 and the camera assembly 16.

Thus, the mounting system 12 can accurately and precisely position the camera assembly 16 relative to the camera opening 56 of the spoiler outer lower panel 20 independently of the spoiler inner panel 18.

Referring to FIG. 1, the spoiler 24 can include a center brake light 140 that is schematically illustrated in phantom. The center brake light 140 can also be referred to as a center high mount stop light, a CHMSL, a stop lamp or a brake lamp. Referring to FIGS. 2 and 4, the spoiler outer lower panel 20 can include a lamp opening 142 and the center brake light can be mounted in the lamp opening 142. The camera assembly 16 can be located adjacent to and spaced away from the lamp opening 142 in the transverse direction T. The center brake light 140 and the lamp opening 142 can be centered on the vehicle 10 with respect to the transverse direction T and the camera assembly 16 can be offset from a center of the vehicle 10 with respect to the transverse direction T.

Referring to FIGS. 2, 3, 5 and 6, the spoiler 14 can include a spoiler outer upper panel 144. The spoiler outer upper panel 144 can be connected to each of the spoiler inner panel 18 and the spoiler outer lower panel 20 in any appropriate manner. The exterior surface of the spoiler outer lower panel 20 can include an upper exterior surface 146 and the spoiler outer upper panel 144 can include an exterior surface 148. The exterior surfaces 146, 148 can form an aerodynamic surface of the spoiler along which air flows when the vehicle 10 is travelling.

Referring to FIGS. 3-6, the spoiler 14 can include a sealing member 150 that extends along the ends 58, 60 of the spoiler inner panel 18. The sealing member 150 can abut the outer surface 44 of the tailgate 24 and seal an interior space of the spoiler 14 from the environment outside of the vehicle 10.

Referring to FIGS. 2 and 7, the exterior surface 54 of the spoiler outer lower panel can include a lower exterior surface 152 and a recess 154 in the lower exterior surface 152 that surrounds the camera opening 56. The camera opening 56 can be centered in the recess 154 with respect to the transverse direction T. The exterior surfaces 152, 154 can be inclined with respect to the longitudinal direction L and the vertical direction V and the recess 156 can be asymmetric with respect to the vertical direction V.

The upper exterior surface 146 and the lower exterior surface 152 of the exterior surface 54 can extend away from each other at an acute angle. The exterior surface 54 of the spoiler outer lower panel 20 can include a curved surface 156 that joins the upper exterior surface 146 and the lower exterior surface 152.

The vehicle 10 can be referred to as a sport-utility vehicle, a SUV, a cross-over vehicle, or a wagon. The vehicle 10 can be configured for travel along any one or combination of improved, unimproved, and unmarked paths. The vehicle 10 can be referred to as a two-wheel drive vehicle, an all-wheel drive vehicle, an on-demand four-wheel drive vehicle, a front-wheel drive vehicle or a rear-wheel drive vehicle. The vehicle 10 can include a longitudinal direction L, a transverse direction T and a vertical direction V that are orthogonal to each other.

While certain embodiments of the invention are described above, it should be understood that the invention can be embodied and configured in many different ways without departing from the spirit and scope of the invention.

For example, embodiments are disclosed above in the context of spoiler mounted on the tailgate 24 shown in FIG.

1. However, alternate embodiments can include a spoiler that is mounted on a different closure such as, but not limited to, a rear hatch (also referred to as a third door, a fifth door, of a hatch door) and a trunk lid (also referred to as a boot, a trunk door, or a deck lid).

In alternate embodiments, the imaging bracket 50 can be formed separately from the camera housing 48 and secured to the camera housing 48 in any appropriate manner. The imaging bracket 50 can include a left side bracket piece and a right side bracket piece that is separate from the left side bracket piece, and the two bracket pieces can be secured onto the camera housing 48 in any appropriate manner.

The aiming and positioning datum 17 described above can include two pairs of abutting datum surfaces 86, 90; 88, 92. However, alternate embodiments can include any number of the abutting datum surfaces including, but not limited to, at least one datum surface on the camera assembly 16 and at least one datum surface on the spoiler inner panel 18.

Instead of a symmetrical cross-sectional shape of a plus sign (+), the protrusions 114, 116 can have a symmetrical cross-sectional shape of the letter "X." Further, alternate embodiments can include the first protrusion 114 with symmetrical cross-sectional shape of a plus sign (+) and the second protrusion 116 with symmetrical cross-sectional shape of the letter "X" and vice versa. Further still, the protrusions 114, 116 can have any appropriate cross-sectional shape such as, but not limited to, a polygon, an irregular shape, an asymmetric shape, or a semicircle and the datum holes 118, 120 can have a cross-sectional shape that is the same shape as or complementary to the cross-sectional shape of the cross-sectional shape of the protrusions 114,116 such that the protrusions 114, 116 are tightly fitted into the datum holes 118, 120.

The fit and finish datum 19 described above can include the pair of protrusions 114, 116 and the pair of datum holes 118, 120. However, alternate embodiments can include any number of the protrusions and datum holes including, but not limited to, at least one protrusion and at least one datum hole. Further, instead of the at least one datum hole, the fit and finish datum 19 can include at least one recess or concavity that has a cross-sectional shape that is complementary to the cross-sectional shape of the at least one projection. Further still, the cross-sectional shape for each of the at least one projection and the at least one datum hole or recess can have a unique orientation such that at least one projection and the at least one datum hole or recess can orient the spoiler outer lower panel 20 in a unique and predetermined orientation with respect to the spoiler inner panel 18.

Each of the features described above with respect to the directions L, T, V can extend along these directions L, T, V in a parallel relationship to these directions or in directions that are substantially parallel to these directions L, T, V such that one of ordinary skill would perceive the features as being parallel to the directions L, T, V. However, alternate embodiments can include any of the features described above such that the feature(s) extend(s) in a direction that is not parallel to any of one of directions L, T, V but includes a directional component that is parallel to at least one of the directions L, T, V.

The tailgate 24 can also be referred to as a liftgate. In alternate embodiments, the tailgate 24 can be pivotally mounted to the body 22 of the vehicle 10 along the lower end 38. In alternate embodiments, the tailgate 24 can be pivotally mounted along the left side 40 or the right side 42.

In alternate embodiments, the tailgate 24 can be split into an upper tailgate and a lower tailgate that are independently and pivotally connected to the body 22 of the vehicle 10. In this split tailgate, the upper tailgate can include the rear window 30 and be pivotally connected to the body 22 of the vehicle 10 along the upper end of the upper tailgate. The lower tailgate can be pivotally connected to the body 22 of the vehicle 10 along the bottom end or along either of the sides.

Instead of the vehicle 10 as depicted in FIG. 1, the vehicle 10 can be configured as a minivan, or a station wagon (also referred to as an estate).

Instead of being mounted on a closure such as a tailgate 24 or a trunk lid, alternate embodiments can include a spoiler 14 that is mounted on a non-movable structure of the vehicle 10 such as, but not limited to, the roof panel 26 and the tailgate 24 can pivot relative to the spoiler 14.

What is claimed is:

1. A center camera mirror system spoiler mounting for a vehicle, comprising:
    a spoiler inner panel configured to be mounted onto an exterior panel of the vehicle; and
    a spoiler outer panel connected to the spoiler inner panel and including,
        an outer surface that is an exterior surface of the vehicle,
        a camera opening passing through the spoiler outer panel, and
        a first datum; and
    a camera assembly fixed to the spoiler inner panel in a predetermined orientation with respect to the spoiler inner panel, and including,
        a lens, and
        a second datum engaging the first datum, the lens being in a predetermined alignment with respect to the camera opening when the second datum engages the first datum.

2. The center camera mirror system spoiler mounting according to claim 1, wherein
    the spoiler inner panel includes a datum surface and the camera assembly abuts the datum surface, the datum surface is spaced away from the spoiler outer panel, the camera assembly is in the predetermined orientation when the camera assembly is fixed to the spoiler inner panel and abuts the datum surface,
    the first datum and the second datum are spaced away from the spoiler inner panel.

3. The center camera mirror system spoiler mounting according to claim 1, wherein
    the first datum is one of a protrusion and a datum hole, and
    the second datum is a different one of the protrusion and the datum hole.

4. The center camera mirror system spoiler mounting according to claim 1, further comprising:
    a fastener fixing the camera assembly to the spoiler inner panel, wherein
    the lens has an optical axis,
    first datum is located between the optical axis of the lens and the fastener with respect to a first direction.

5. The center camera mirror system spoiler mounting according to claim 1, wherein
    the spoiler inner panel includes pair of datum surfaces,
    the camera assembly includes a housing and an imaging bracket protruding from the housing, the lens is mounted in the housing, the imaging bracket is fixed to the spoiler inner panel and abuts the datum surfaces,
    the second datum includes a pair of datum holes passing through the mounting flange, the housing is located between the datum holes, the spoiler outer panel includes an inner surface that faces toward the spoiler inner panel, and the first datum includes a pair of projections that protrude from the inner surface and extend through the datum holes, respectively.

6. The center camera mirror system spoiler mounting according to claim 5, wherein the datum holes are spaced apart in a first direction and the lens is located between the datum holes with respect to the first direction, and the projections have a cross-sectional shape of a cross.

7. The center camera mirror system spoiler mounting according to claim 1, wherein the camera assembly includes a housing and an imaging bracket protruding from the housing, the lens is mounted in the housing, the spoiler inner panel includes,
  a pair of mounting holes that are spaced apart in the first direction, the mounting flange is fixed to the spoiler inner panel at the mounting holes, and
  a housing opening located between the mounting holes in the first direction, the housing passes through the housing opening and into the camera opening, and the second datum is on the imaging bracket and located between housing and one of the mounting holes.

8. The center camera mirror system spoiler mounting according to claim 1, wherein the spoiler inner panel includes a pair of datum surfaces, the camera assembly includes an imaging bracket that abuts the datum surfaces, the second datum includes a pair of datum holes passing through the imaging bracket, the first datum includes a pair of projections that protrude from the spoiler outer panel and extend through the pair of datum holes, respectively, the imaging bracket includes a pair mounting holes, the datum holes extend through the datum surfaces, respectively, and the imaging bracket is fixed to the spoiler inner panel at the mounting holes, the lens has a lens axis that is located between the mounting holes in a first direction, and the datum holes are located between the mounting holes in the first direction.

9. The center camera mirror system spoiler mounting according to claim 1, wherein spoiler inner panel includes, a housing opening passing through the spoiler inner panel, a pair of mounting tabs spaced apart from each other by the assembly opening, a pair of mounting clips abutting the mounting tabs, respectively, each of the mounting clips includes a datum surface, and the camera assembly is fixed to the mounting clips, abuts the datum surfaces, and extends through the assembly opening.

10. A center camera mirror system spoiler mounting for a vehicle, comprising:

a spoiler configured to be mounted at a rear end of the vehicle, the spoiler includes an aerodynamic surface that is configured to be exposed to air flowing along the vehicle when the vehicle is travelling, the spoiler including,
  an inner panel configured to be mounted onto an exterior panel of the vehicle and including a datum surface having a predetermined orientation,
  an outer panel connected to the inner spoiler panel and including,
    an outer surface forming at least a portion of the aerodynamic surface,
    a camera opening passing through the outer panel, and
    a first datum; and a camera assembly fixed to and abutting the datum surface, and including,
  a lens, and
  a second datum spaced away from the lens and engaging the first datum structure, the lens being in a predetermined alignment with respect to the camera opening when the second datum engages the first datum.

11. The center camera mirror system spoiler mounting according to claim 10, wherein the camera assembly includes a housing and an imaging bracket protruding from the housing, the lens is mounted in the housing, the imaging bracket is directly fixed to the spoiler inner panel and abuts the datum surface, the second datum includes a pair of datum holes passing through the imaging bracket, the housing is located between the datum holes, the spoiler outer panel includes an inner surface that faces toward the spoiler inner panel, and the first datum includes a pair of projections that protrude from the inner surface and extend through the pair of datum holes, respectively.

12. The center camera mirror system spoiler mounting according to claim 11, wherein the datum holes are spaced apart in a first direction, and the lens includes an optical axis that is located between the datum holes with respect to the first direction.

13. The center camera mirror system spoiler mounting according to claim 12, wherein the spoiler inner panel includes,
  a pair of mounting holes that are spaced apart in the first direction, the imaging bracket is fixed to spoiler inner panel at the mounting holes, and
  a housing opening located between the mounting holes in the first direction, the housing passes through the housing opening and into the camera opening, and the datum holes are located between the mounting holes in the first direction.

14. A center camera mirror system spoiler mounting for a vehicle, comprising:

a spoiler inner panel configured to be mounted onto an exterior panel of the vehicle and including a first datum surface;

a spoiler outer panel connected to the spoiler inner panel and including,
  an outer surface that is an exterior surface of the vehicle,
  a camera opening passing through the spoiler outer panel, and
  a first datum; and a camera assembly fixed to the spoiler inner panel and abutting the first datum surface, the camera assembly including,
  a lens having an optical axis, and
  a second datum engaging the first datum structure, the optical axis being in a predetermined alignment with respect to the camera opening when the second datum engages the first datum.

15. The center camera mirror system spoiler mounting according to claim 14, wherein the inner panel includes a second datum surface, each of the first datum surface and the second datum surfaces has a predetermined location relative to the exterior panel in the longitudinal direction of the vehicle, a predetermined rotational orientation about the transverse direction of the vehicle, and the predetermined rotation about a vertical direction of the vehicle when the tailgate is mounted on the vehicle, the longitudinal direction, the transverse direction, and the vertical direction are orthogonal to each other, each of the first datum surface and the second datum surface are spaced away from the outer lower panel, the camera assembly is fixed the inner panel at the second datum surface.

16. The center camera mirror system spoiler mounting according to claim 14, wherein the first datum and the second datum are spaced away from the inner panel, the first datum includes one of a hole and a projection, and the second datum includes a different one of the hole and the projection.

17. The center camera mirror system spoiler mounting according to claim 14, wherein the second datum includes a first datum hole and a second datum hole, the first datum includes a first projection and a second projection, engagement of the first datum hole by the first datum projection locates the camera opening relative to the optical axis in at least a first predetermined direction, engagement of the second datum hole by the second datum projection locates the camera opening relative to the optical axis in at least the first predetermined direction and a second predetermined direction that is perpendicular to the first predetermined direction, the lens has an optical axis that is located between the pair of holes in a transverse direction of the vehicle when the tailgate is mounted on the vehicle.

18. The center camera mirror system spoiler mounting according to claim 14, wherein the outer lower panel includes a first outer surface, the spoiler includes an outer upper panel connected to both of the outer lower panel and the inner panel, the outer upper panel includes a second outer surface, and the first outer surface and the second outer surface form an aerodynamic surface along which air flows when the tailgate is mounted on the vehicle and the vehicle is traveling.

19. The center camera mirror system spoiler mounting according to claim 14, wherein the outer lower panel includes an upper outer surface and a lower outer surface that extends at an acute angle from the upper outer surface, and the lower outer surface includes a recess that surrounds the camera opening.

20. A tailgate assembly for a vehicle, the vehicle having a longitudinal direction, a transverse direction and a vertical direction that are orthogonal to each other, the tailgate assembly comprising:

the center camera mirror system spoiler mounting according to claim 14;

a tailgate configured to be pivotally mounted on the vehicle and including the exterior panel of the vehicle and a window opening; and a glass panel mounted in the window opening, wherein the spoiler includes a center opening and a stop lamp assembly mounted in the center opening, the center opening is centered on the vehicle in a transverse direction of the vehicle when the tailgate is mounted on the vehicle, and the camera opening is spaced away from the center opening in the transverse direction of the vehicle when the tailgate is mounted on the vehicle.

\* \* \* \* \*